(12) United States Patent
Langhammer

(10) Patent No.: US 8,484,265 B1
(45) Date of Patent: Jul. 9, 2013

(54) ANGULAR RANGE REDUCTION IN AN INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 722 days.

(21) Appl. No.: 12/717,212

(22) Filed: Mar. 4, 2010

(51) Int. Cl.
*G06F 7/00* (2006.01)
*G06F 15/00* (2006.01)

(52) U.S. Cl.
USPC .......................... 708/201; 708/205; 708/209

(58) Field of Classification Search
None
See application file for complete search history.

(56) References Cited

U.S. PATENT DOCUMENTS

| | | | |
|---|---|---|---|
| 3,473,160 A | 10/1969 | Wahlstrom | |
| 3,896,299 A | 7/1975 | Rhodes | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,736,335 A | 4/1988 | Barkan | |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |
| 4,912,345 A | 3/1990 | Steele et al. | |
| 4,918,637 A | 4/1990 | Morton | |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "Stratix II Device Handbook, Chapter 6—DSP Blocks in Stratix II Devices," v1.1, Jul. 2004.

(Continued)

*Primary Examiner* — Scott Sun
(74) *Attorney, Agent, or Firm* — Ropes & Gray LLP; Jeffrey H. Ingerman

(57) ABSTRACT

Circuitry for deriving a range-reduced value of an angle represented by a number having a mantissa and an exponent includes memory that stores a table that identifies, for each one of a plurality of values of the exponent, a base fractional rotation associated with said one of said plurality of values of said exponent, and an incremental fractional rotation associated with each increment of said mantissa. The circuitry further includes a multiplier that multiplies the mantissa by the incremental fractional rotation to provide a product representing a mantissa contribution. An adder adds the base fractional rotation to any fractional portion of the mantissa contribution. The fractional portion of the result of that addition represents the range-reduced angle. That representation can be multiplied by a constant representing one complete rotation in a desired angular measurement system, to convert that representation to a value representing the range-reduced angle in that measurement system.

25 Claims, 4 Drawing Sheets

U.S. PATENT DOCUMENTS

| | | |
|---|---|---|
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |

| | | | | | | |
|---|---|---|---|---|---|---|
| 6,154,049 | A | 11/2000 | New | 6,978,287 | B1 | 12/2005 Langhammer |
| 6,157,210 | A | 12/2000 | Zaveri et al. | 6,983,300 | B1 | 1/2006 Ferroussat |
| 6,163,788 | A | 12/2000 | Chen et al. | 7,020,673 | B2 | 3/2006 Ozawa |
| 6,167,415 | A | 12/2000 | Fischer et al. | 7,047,272 | B2 | 5/2006 Giacalone et al. |
| 6,175,849 | B1 | 1/2001 | Smith | 7,062,526 | B1 | 6/2006 Hoyle |
| 6,215,326 | B1 | 4/2001 | Jefferson et al. | 7,093,204 | B2 | 8/2006 Oktem et al. |
| 6,226,735 | B1 | 5/2001 | Mirsky | 7,107,305 | B2 | 9/2006 Deng et al. |
| 6,242,947 | B1 | 6/2001 | Trimberger | 7,113,969 | B1 | 9/2006 Green et al. |
| 6,243,729 | B1 | 6/2001 | Staszewski | 7,181,484 | B2 | 2/2007 Stribaek et al. |
| 6,246,258 | B1 | 6/2001 | Lesea | 7,313,585 | B2 | 12/2007 Winterrowd |
| 6,260,053 | B1 | 7/2001 | Maulik et al. | 7,395,298 | B2 | 7/2008 Debes et al. |
| 6,279,021 | B1 | 8/2001 | Takano et al. | 7,401,109 | B2 | 7/2008 Koc et al. |
| 6,286,024 | B1 | 9/2001 | Yano et al. | 7,409,417 | B2 | 8/2008 Lou |
| 6,314,442 | B1 | 11/2001 | Suzuki | 7,415,542 | B2 | 8/2008 Hennedy et al. |
| 6,314,551 | B1 | 11/2001 | Borland | 7,421,465 | B1 | 9/2008 Rarick et al. |
| 6,321,246 | B1 | 11/2001 | Page et al. | 7,428,565 | B2 | 9/2008 Fujimori |
| 6,323,680 | B1 | 11/2001 | Pedersen et al. | 7,428,566 | B2 | 9/2008 Siu et al. |
| 6,327,605 | B2 | 12/2001 | Arakawa et al. | 7,430,578 | B2 | 9/2008 Debes et al. |
| 6,351,142 | B1 | 2/2002 | Abbott | 7,430,656 | B2 | 9/2008 Sperber et al. |
| 6,353,843 | B1 | 3/2002 | Chehrazi et al. | 7,447,310 | B2 | 11/2008 Koc et al. |
| 6,359,468 | B1 | 3/2002 | Park et al. | 7,472,155 | B2 | 12/2008 Simkins et al. |
| 6,360,240 | B1 | 3/2002 | Takano et al. | 7,508,936 | B2 | 3/2009 Eberle et al. |
| 6,362,650 | B1 | 3/2002 | New et al. | 7,536,430 | B2 | 5/2009 Guevokian et al. |
| 6,366,944 | B1 | 4/2002 | Hossain et al. | 7,567,997 | B2 | 7/2009 Simkins et al. |
| 6,367,003 | B1 | 4/2002 | Davis | 7,590,676 | B1 | 9/2009 Langhammer |
| 6,369,610 | B1 | 4/2002 | Cheung et al. | 7,646,430 | B2 | 1/2010 Brown Elliott et al. |
| 6,377,970 | B1 | 4/2002 | Abdallah et al. | 7,668,896 | B2 | 2/2010 Lutz et al. |
| 6,385,632 | B1 | 5/2002 | Choe et al. | 7,719,446 | B2 | 5/2010 Rosenthal et al. |
| 6,407,576 | B1 | 6/2002 | Ngai et al. | 7,769,797 | B2 | 8/2010 Cho et al. |
| 6,407,694 | B1 | 6/2002 | Cox et al. | 7,930,335 | B2 | 4/2011 Gura |
| 6,427,157 | B1 | 7/2002 | Webb | 7,930,336 | B2 | 4/2011 Langhammer |
| 6,434,587 | B1 | 8/2002 | Liao et al. | 2001/0023425 | A1 | 9/2001 Oberman et al. |
| 6,438,569 | B1 | 8/2002 | Abbott | 2001/0029515 | A1 | 10/2001 Mirsky |
| 6,438,570 | B1 | 8/2002 | Miller | 2001/0037352 | A1 | 11/2001 Hong |
| 6,446,107 | B1 | 9/2002 | Knowles | 2002/0002573 | A1 | 1/2002 Landers et al. |
| 6,453,382 | B1 | 9/2002 | Heile | 2002/0038324 | A1 | 3/2002 Page et al. |
| 6,467,017 | B1 | 10/2002 | Ngai et al. | 2002/0049798 | A1 | 4/2002 Wang et al. |
| 6,480,980 | B2 | 11/2002 | Koe | 2002/0078114 | A1 | 6/2002 Wang et al. |
| 6,483,343 | B1 | 11/2002 | Faith et al. | 2002/0089348 | A1 | 7/2002 Langhammer |
| 6,487,575 | B1 | 11/2002 | Oberman | 2002/0116434 | A1 | 8/2002 Nancekievill |
| 6,523,055 | B1 | 2/2003 | Yu et al. | 2002/0129073 | A1* | 9/2002 Page et al. ............... 708/300 |
| 6,523,057 | B1 | 2/2003 | Savo et al. | 2003/0088757 | A1 | 5/2003 Lindner et al. |
| 6,531,888 | B2 | 3/2003 | Abbott | 2004/0064770 | A1 | 4/2004 Xin |
| 6,538,470 | B1 | 3/2003 | Langhammer et al. | 2004/0083412 | A1 | 4/2004 Corbin et al. |
| 6,542,000 | B1 | 4/2003 | Black et al. | 2004/0103133 | A1 | 5/2004 Gurney |
| 6,556,044 | B2 | 4/2003 | Langhammer et al. | 2004/0122882 | A1 | 6/2004 Zakharov et al. |
| 6,557,092 | B1 | 4/2003 | Callen | 2004/0148321 | A1 | 7/2004 Guevorkian et al. |
| 6,571,268 | B1 | 5/2003 | Giacalone et al. | 2004/0172439 | A1 | 9/2004 Lin |
| 6,573,749 | B2 | 6/2003 | New et al. | 2004/0178818 | A1 | 9/2004 Crotty et al. |
| 6,574,762 | B1 | 6/2003 | Karimi et al. | 2004/0193981 | A1 | 9/2004 Clark et al. |
| 6,591,283 | B1 | 7/2003 | Conway et al. | 2004/0267857 | A1 | 12/2004 Abel et al. |
| 6,591,357 | B2 | 7/2003 | Mirsky | 2004/0267863 | A1 | 12/2004 Bhushan et al. |
| 6,600,495 | B1 | 7/2003 | Boland et al. | 2005/0038842 | A1 | 2/2005 Stoye |
| 6,600,788 | B1 | 7/2003 | Dick et al. | 2005/0144212 | A1 | 6/2005 Simkins et al. |
| 6,628,140 | B2 | 9/2003 | Langhammer et al. | 2005/0144215 | A1 | 6/2005 Simkins et al. |
| 6,687,722 | B1 | 2/2004 | Larsson et al. | 2005/0144216 | A1 | 6/2005 Simkins et al. |
| 6,692,534 | B1 | 2/2004 | Wang et al. | 2005/0166038 | A1 | 7/2005 Wang et al. |
| 6,700,581 | B2 | 3/2004 | Baldwin et al. | 2005/0187997 | A1 | 8/2005 Zheng et al. |
| 6,725,441 | B1 | 4/2004 | Keller et al. | 2005/0187999 | A1 | 8/2005 Zheng et al. |
| 6,728,901 | B1 | 4/2004 | Rajski et al. | 2005/0262175 | A1 | 11/2005 Iino et al. |
| 6,731,133 | B1 | 5/2004 | Feng et al. | 2006/0020655 | A1 | 1/2006 Lin |
| 6,732,134 | B1 | 5/2004 | Rosenberg et al. | 2006/0059215 | A1 | 3/2006 Maharatna et al. |
| 6,744,278 | B1 | 6/2004 | Liu et al. | 2007/0083585 | A1 | 4/2007 St. Denis et al. |
| 6,745,254 | B2 | 6/2004 | Boggs et al. | 2007/0124352 | A1 | 5/2007 Wittig |
| 6,763,367 | B2 | 7/2004 | Kwon et al. | 2007/0185951 | A1 | 8/2007 Lee et al. |
| 6,771,094 | B1 | 8/2004 | Langhammer et al. | 2007/0185952 | A1 | 8/2007 Langhammer et al. |
| 6,774,669 | B1 | 8/2004 | Liu et al. | 2007/0241773 | A1 | 10/2007 Hutchings et al. |
| 6,781,408 | B1 | 8/2004 | Langhammer | 2008/0133627 | A1 | 6/2008 Langhammer et al. |
| 6,781,410 | B2 | 8/2004 | Pani et al. | 2008/0183783 | A1 | 7/2008 Tubbs |
| 6,788,104 | B2 | 9/2004 | Singh et al. | 2009/0172052 | A1 | 7/2009 DeLaquil et al. |
| 6,801,924 | B1 | 10/2004 | Green et al. | 2009/0187615 | A1 | 7/2009 Abe et al. |
| 6,801,925 | B2 | 10/2004 | Green et al. | 2009/0300088 | A1 | 12/2009 Michaels et al. |
| 6,836,839 | B2 | 12/2004 | Master et al. | 2010/0098189 | A1 | 4/2010 Oketani |
| 6,874,079 | B2 | 3/2005 | Hogenauer | | | |
| 6,889,238 | B2 | 5/2005 | Johnson | | | |
| 6,904,471 | B2 | 6/2005 | Boggs et al. | EP | 0 411 491 | 2/1991 |
| 6,924,663 | B2 | 8/2005 | Masui et al. | EP | 0 461 798 | 12/1991 |
| 6,963,890 | B2 | 11/2005 | Dutta et al. | EP | 0 498 066 | 8/1992 |
| 6,971,083 | B1 | 11/2005 | Farrugia et al. | EP | 0 555 092 | 8/1993 |

FOREIGN PATENT DOCUMENTS

| | | |
|---|---|---|
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Xilinx Inc., "Complex Multiplier v2.0", DS291 Product Specification/Datasheet, Nov. 2004.
Altera Corporation, "FIR Compiler: MegaCore® Function User Guide," version 3.3.0, rev. 1, pp. 3 11 through 3 15 (Oct. 2005).
Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.
Govindu, G. et al., "Analysis of High-performance Floating-point Arithmetic on FPGAs," *Proceedings of the 18$^{th}$ International Parallel and Distributed Processing Symposium (PDPS'04)*, pp. 149-156, Apr. 2004.
Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.
Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.
Vladimirova, T. et al., "Floating-Point Mathematical Co-Processor for a Single-Chip On-Board Computer," *MAPLD'03 Conference, D5*, Sep. 2003.
Altera Corporation, "Digital Signal Processing (DSP)," *Stratix Device Handbook*, vol. 2, Chapter 6 and Chapter 7, v1.1 (Sep. 2004).
Altera Corporation, "DSP Blocks in Stratix II and Stratix II GX Devices," *Stratix II Device Handbook*, vol. 2, Chapter 6, v4.0 (Oct. 2005).
Amos, D., "PLD architectures match DSP algorithms," *Electronic Product Design*, vol. 17, No. 7, Jul. 1996, pp. 30, 32.
Analog Devices, Inc., The Applications Engineering Staff of Analog Devices, DSP Division, *Digital Signal Processing Applications Using the ADSP-2100 Family* (edited by Amy Mar), 1990, pp. 141-192).
Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.
Aoki, T., "Signed-weight arithmetic and its application to a field-programmable digital filter architecture," *IEICE Transactions on Electronics*, 1999, vol. E82C, No. 9, Sep. 1999, pp. 1687-1698.
Ashour, M.A., et al., "An FPGA implementation guide for some different types of serial-parallel multiplier-structures," *Microelectronics Journal*, vol. 31, No. 3, 2000, pp. 161-168.
Berg, B.L., et al."Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, P., "When DSPs and FPGAs meet: Optimizing image processing architectures," *Advanced Imaging*, vol. 12, No. 9, Sep. 1997, pp. 14, 16, 18.
Crookes, D., et al., "Design and implementation of a high level programming environment for FPGA-based image processing," *IEE Proceedings-Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.
Gaffer, A.A., et al., "Floating-Point Bitwidth Analysis via Automatic Differentiation," *IEEE Conference on Field Programmable Technology*, Hong Kong, Dec. 2002.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.
Jones, G., "Field-programmable digital signal conditioning," *Electronic Product Design*, vol. 21, No. 6, Jun. 2000, pp. C36-C38.
Kiefer, R., et al., "Performance comparison of software—FPGA hardware partitions for a DSP application," *14th Australian Micro-* electronics Conference. Microelectronics: Technology Today for the Future. MICRO '97 Proceedings, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics (Cat.No. 99TH8465)*, vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+FDSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWXON 2000: 2000 IEEE Radio and Wireless Conference (Cat. No. 00EX404)*, Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science vol. 1673)*, Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Haynes, S.D., et al., "Configurable multiplier blocks for embedding in FPGAs," *Electronics Letters*, vol. 34, No. 7, pp. 638-639 (Apr. 2, 1998).

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

\* cited by examiner

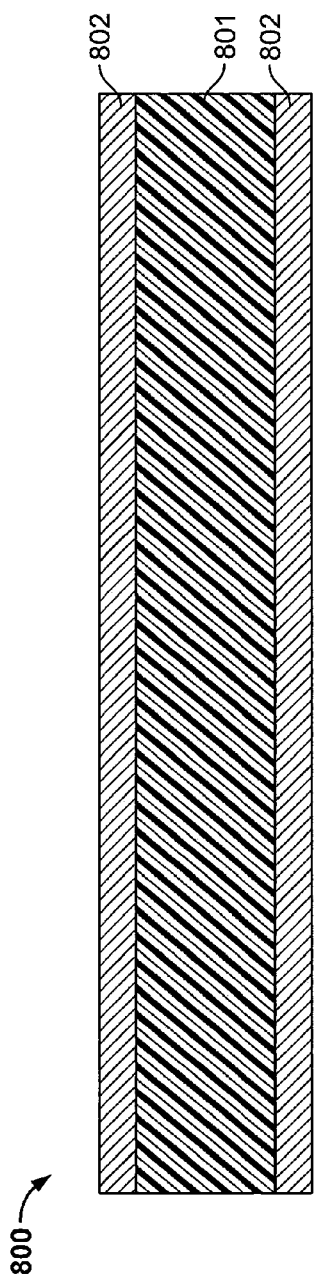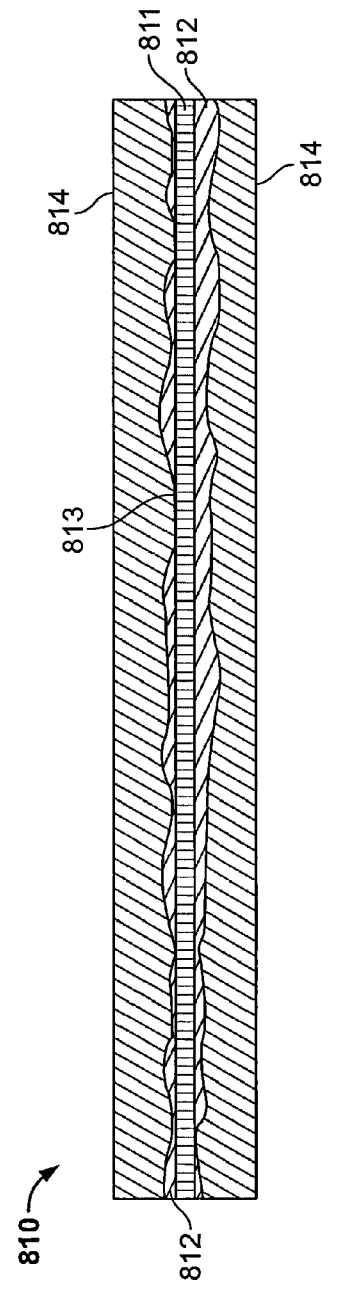

ANGULAR RANGE REDUCTION IN AN INTEGRATED CIRCUIT DEVICE

BACKGROUND OF THE INVENTION

This invention relates to performing range reduction on values representing angles in integrated circuit devices, and particularly in programmable integrated circuit devices such as programmable logic devices (PLDs).

Trigonometric functions are generally defined for the relatively small angular range of 0-360°, or 0-2π radians. For angular values above 2π, the values of the trigonometric functions repeat. Indeed, one could restrict the range to 0-π/2, because various trigonometric identities can be used to derive values for trigonometric functions of any angle between π/2 and 2π from trigonometric functions of angles between 0 and π/2.

When determining the trigonometric function of a floating-point value (e.g., a value represented in accordance with the IEEE754-1985 standard for floating-point arithmetic), one of the first steps is to reduce the value to the range 0-2π (i.e., for a value x, to determine y=mod(x, 2π)).

Theoretically, one can calculate y=x−((int(x/2π))×2π). However, such a calculation is expensive in hardware, such as in programmable integrated circuit devices. For example, if x is large, int(x/2π) also will be large, and therefore memory must be provided for storing very large, very high precision numbers (i.e., numbers of higher precision than the 23 bits called for by the aforementioned IEEE754-1985 standard). In addition, the larger the value of x, the more iterations in the calculation.

SUMMARY OF THE INVENTION

One way to consider the problem of angular range reduction is to imagine rotation around a circle multiple times, usually ending up at some point part-way around the circle (although by happenstance one could end up at the beginning/end of the circle). If one were to discard all of the full rotations, and leave only the fractional rotation, one would reach the same result. The present invention discards all non-fractional rotations.

A normalized input value in accordance with the aforementioned standard (and these principles can be adapted to other standards as well) includes a mantissa having an implied leading "1" and an integer exponent representing the power of 2 by which the mantissa is multiplied. Thus, a number having a mantissa of "0" and an exponent n represents $1.0 \times 2^n$. That number represents some number of full rotations around a circle plus, potentially, a partial rotation.

For a non-zero mantissa, the mantissa represents at least a further partial rotation plus, potentially, a number of full rotations. Because there are 23 bits, there are $2^{23}$ possible rotational increments for each exponent value. However, for a given exponent value, each increment results in a rotational increment of equal size.

Therefore, a table may be generated to store two values for each possible exponent value n (e.g., n=0-255). One of the two values is the leftover (i.e., modulo-2π) fractional portion of the rotation represented by $1.0 \times 2^n$, which may be referred to the base fractional rotation of the range-reduced angle (for small enough exponents, this will be the full rotation attributable to $1.0 \times 2^n$). The other of the two values is the leftover (i.e., modulo-2π) fractional rotation represented by a single bit change in the mantissa for that exponent (for larger exponents, the full rotation for one increment may exceed one full rotation and will have a leftover fractional rotation, but for small enough exponents the full rotation for one increment will likely be a fractional rotation).

For a non-zero mantissa associated with a particular exponent, the mantissa value (without the implied leading "1" which is taken care of by the base fractional rotation) is multiplied by the increment associated with that exponent to determine the contribution to the range-reduced angle from the mantissa and any non-fractional portion (to the left of the binal point) of that product is discarded, leaving a fractional rotation attributable to the mantissa.

The base fractional rotation is added to the fractional rotation attributable to the mantissa to yield the total range-reduced rotation value. Once again, any non-fractional portion of that sum is discarded to provide the final range-reduced rotation value, which can be multiplied by 2π, or another constant representing a complete circle, to yield the angle. Any trigonometric function can then be computed using any desired technique, such as CORDIC.

Therefore, in accordance with the present invention there is provided circuitry for deriving a range-reduced value of an angle represented by a number having a mantissa and an exponent. The circuitry includes memory that stores a table that identifies, for each one of a plurality of values of the exponent, a base fractional rotation associated with that one of the plurality of values of said exponent, and an incremental fractional rotation associated with each increment of the mantissa. The circuitry further includes a multiplier that multiplies the mantissa by the incremental fractional rotation to provide a product representing a mantissa contribution. An adder adds the base fractional rotation to any fractional portion of the mantissa contribution.

A corresponding method for determining the range-reduced angle, a method for configuring an integrated circuit device as such circuitry, and a programmable integrated circuit device so configurable, are also provided. Further, a machine-readable data storage medium encoded with instructions for performing the method of configuring an integrated circuit device is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 3 is a cross-sectional view of a magnetic data storage medium encoded with a set of machine-executable instructions for performing the method according to the present invention;

FIG. 4 is a cross-sectional view of an optically readable data storage medium encoded with a set of machine executable instructions for performing the method according to the present invention.

DETAILED DESCRIPTION OF THE INVENTION

In portions of the foregoing discussion and of the discussion below, angular measurements are described in terms of radians, where $2\pi$ radians represents one complete circle. However, it will be appreciated that the present invention is not limited to any particular angular measurement system and any references to angular measurements in radians may be replaced with references to angular measurements in degrees (where 360 degrees represents one complete circle), grads or gradians (where 400 grads represents one complete circle), or any other angular measurement system. In its most general form, the invention may be described with reference to fractional rotations, otherwise referred to as fractions of a circle.

Figure 1:
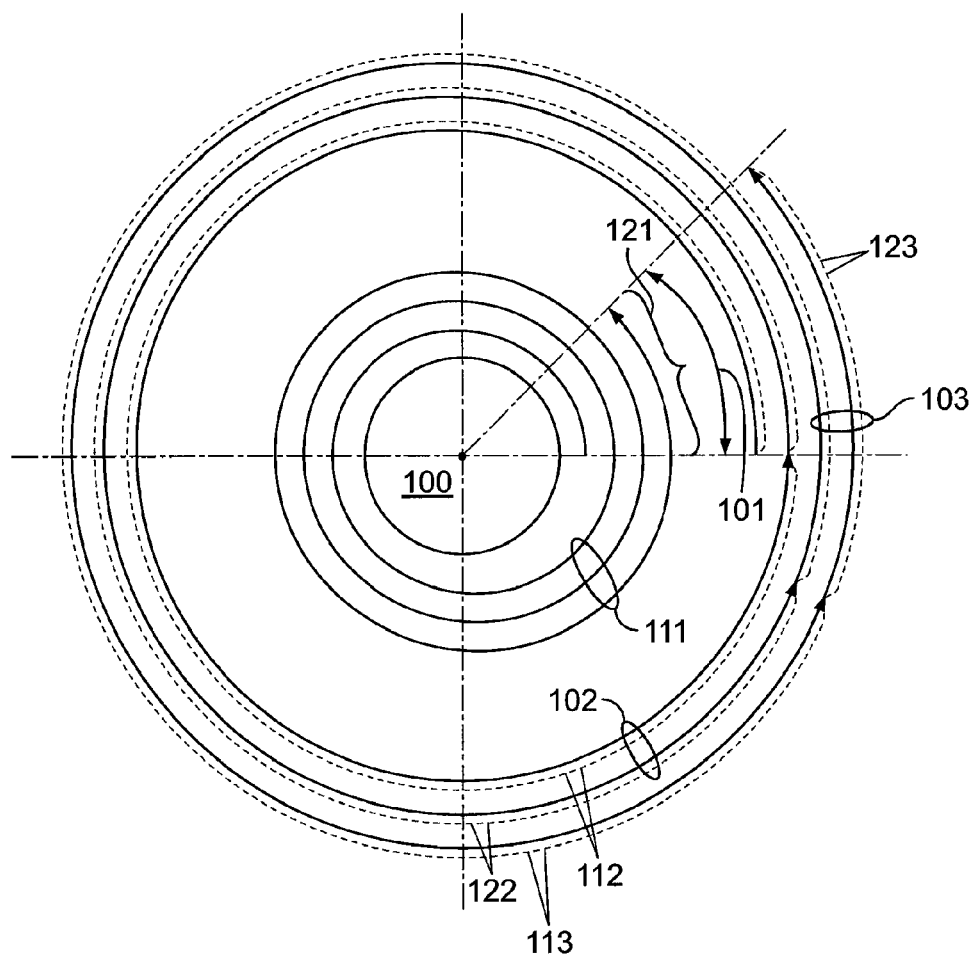
FIG. 1 shows the contributions to an angle from the exponent and mantissa of a floating point number.

FIG. 1 shows a circle 100 and an angle 101 including multiple complete rotations 111 around circle 100, plus a fractional rotation 121. Angle 101 may be represented mathematically as $1.xx \times 2^n$ rotations around circle 100, which is the sum of $1.0 \times 2^n$ rotations 102 and $0.xx \times 2^n$ rotations 103. Rotations 102 normally will have at least one complete rotation 112 as well as a fractional rotation 122. Although for most n, n is small that rotations 103 include only a fractional rotation, in the most general case, and in the example shown, n may be large enough that rotations 103 includes at least one complete rotation 113 as well as a fractional rotation 123.

It will be recognized that fractional rotation 121 is the desired range-reduced angle. It also will be recognized that in adding angle 102 and angle 103, any full rotations (i.e., non-fractional rotations) 112, 113 may be discarded in determining the fractional rotational portion of the sum. Therefore, it will further be recognized that the desired range-reduced angle is the fractional rotational portion of the sum of fractional rotation 122 and fractional rotation 123. It should be clear that depending on the sizes of fractional rotation 122 and fractional rotation 123, their sum may have only a fractional portion, or may also (as in the example shown) have a non-fractional rotation to be discarded.

In accordance with embodiments of the present invention, the rotations associated with a given exponent n may be precomputed. For example, in accordance with the foregoing IEEE754-1985 standard, n may range from 0 to 255 with an offset of 127, meaning that n=127 represents a "true" exponent of 0, while values of $n \leq 126$ represent negative exponents with "true" values down to −127 and values of $n \geq 128$ represent positive exponents with "true" values up to +128. For operation in accordance with that standard, rotations associated with 256 values of n may be precomputed and stored in, e.g., a table.

For each value of n, the table may include two entries. The first entry associated with each value of n may be the fractional portion of the rotation associated with $1.0 \times 2^n$ (as discussed above, the non-fractional rotation may be discarded), which may be referred to as the "base fractional rotation." The second entry associated with each value of n may be the fractional portion of the rotation associated with each incremental bit of the mantissa x of $0.xx \times 2^n$ (only for very large n would one expect there to be a nonfractional portion of the incremental rotation, but if there is, there is no reason to store it and it may be discarded). While there may be a large number of incremental rotations for every value of n (e.g., in single-precision IEEE754-1985 floating point arithmetic, where the mantissa has 23 bits, there are $2^{23}=8,388,608$ increments), each contributes the same amount of rotation. That increment itself preferably is stored with twice the precision of the standard being used to maintain the desired precision in the final result. Therefore, when using IEEE754-1985 arithmetic, the incremental rotations may be stored with at least 46 bits of precision.

To determine the range-reduced angle represented by $1.xx \times 2^n$, one need only multiply x by the incremental rotation associated with n, discard the non-fractional rotational portion of that product, and add to the fractional rotational portion of that product the base fractional rotation associated with n. The fractional portion of that sum is the desired range-reduced angle, represented as a fractional rotation. That fractional rotation may be multiplied by the appropriate constant for the angular measurement system being used ($2\pi$, 360, 400, etc., as discussed above) to obtain the desired angular value.

Figure 2:
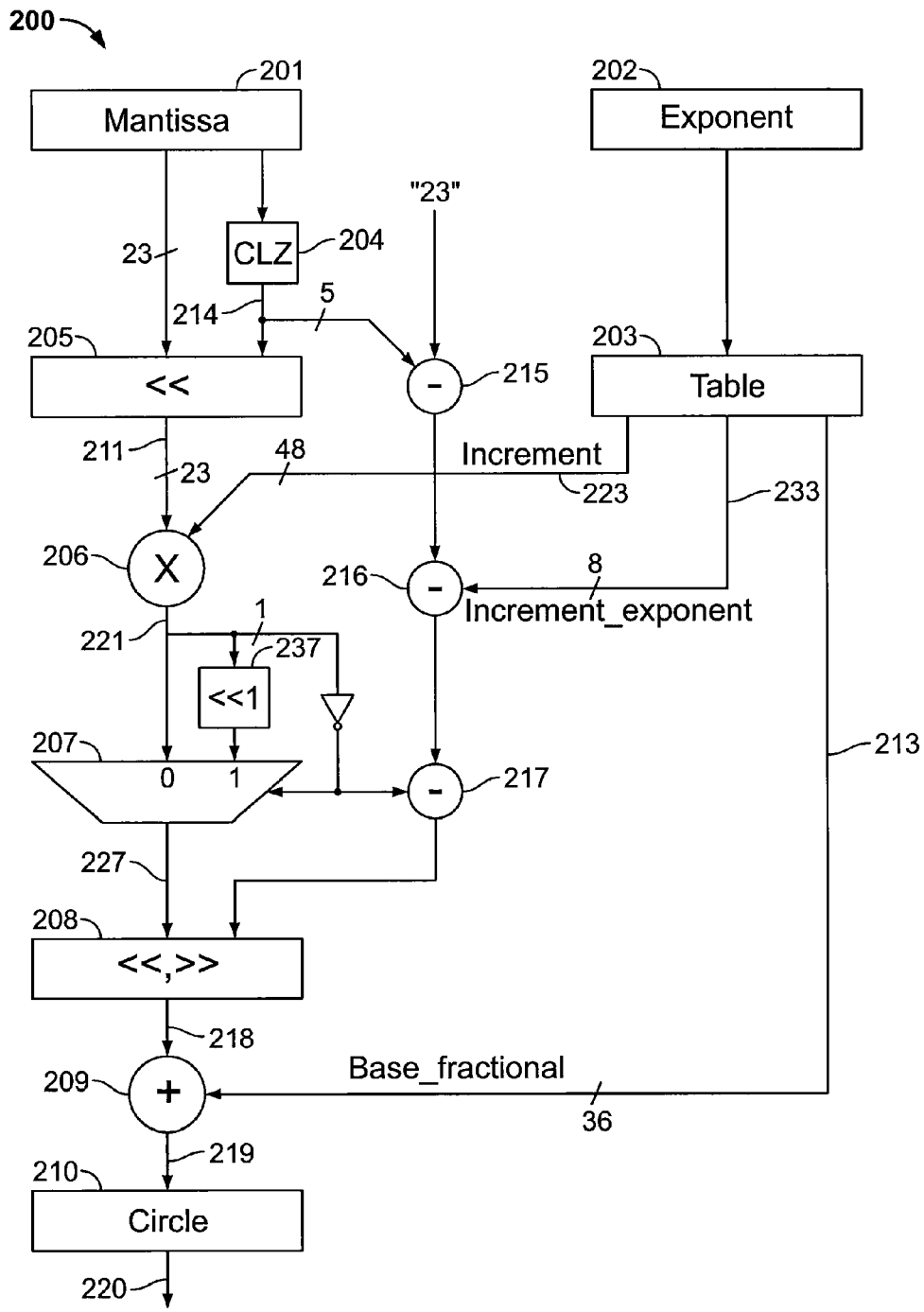
FIG. 2 is a simplified block diagram of an implementation of a logical structure according to an embodiment of the present invention.

A logical structure 200 according to an embodiment of the present invention is shown in FIG. 2. Structure 200 may be implemented as circuitry. In some embodiments, structure 200 may be implemented in a programmable device, such as an FPGA, either in programmable logic, or in a combination of programmable logic and fixed logic (e.g., adders and multipliers) if provided. For example, FPGAs in the STRATIX® family of FPGAs available from Altera Corporation, of San Jose, Calif., include digital signal processing blocks having multipliers and adders and programmable interconnect for connecting the multipliers and adders. Such an FPGA may be configured to use the multipliers and adders, as well as any programmable logic that may be needed, to implement structure 200. In addition, the aforementioned STRATIX® FPGAs include embedded memories of various sizes which may useful for storing the table discussed above.

As shown in FIG. 2, the aforementioned value $1.xx \times 2^n$ is input as an input mantissa 201 (x) and an input exponent 202 (n). Input exponent 202 is input to table 203 to look up base fractional value 213, as well as the incremental rotation for each increment of input mantissa 201. The incremental rotation itself has an increment mantissa 223 and an increment exponent 233.

To maintain precision, input mantissa 201 is "normalized" to value between $0.5_{10}$ and $0.999 \ldots 9_{10}$ (i.e., $0.1_2$ and $0.111 \ldots 1_2$) by counting any leading zeroes at count-leading-zeroes module 204 and using the result 214 to left-shift input mantissa 201 at left-shifter 205. The amount of shifting is kept track of by subtracting result 214 from the constant value $23_{10}$ at subtractor 215. "Normalized" input mantissa 211 is multiplied at multiplier 206 by increment mantissa 223, which preferably also has been "normalized" to value between $0.5_{10}$ and $0.999 \ldots 9_{10}$ (i.e., $0.1_2$ and $0.111 \ldots 1_2$). Therefore, product 221 preferably will have a value between $0.25_{10}$ and $0.999 \ldots 9_{10}$ (i.e., $0.01_2$ and $0.111 \ldots 1_2$). Increment exponent 233 is subtracted at 216 from the difference previously computed by subtractor 215.

The first bit after the binal point of product 221 is used to control multiplexer 207. If that bit is a "1", multiplexer 207 outputs product 221 at 227 and a "0" is subtracted at 217 from the difference previously computed by subtractor 216. If the first bit after the binal point of product 221 is a "0", then multiplexer 207 outputs at 227 the value of product 221 left-shifted by one place in shifter 237, and a "1" is subtracted at 217 from the difference previously computed by subtractor 216.

The difference computed at 217, which could be positive, negative or zero, is used at barrel-shifter 208 to shift output 227 right, left, or not at all, to provide a normalized contribution 218 by the input mantissa 201 to the desired angular value. Any non-fractional-rotational portion of contribution 218 is discarded (this requires simply ignoring the upper bits of the result), and the resulting fractional-rotational portion of contribution 218 is added at 209 to base fractional value 213.

Because both inputs to adder 209 are "normalized" fractional values, sum 219 will be a number between 0 and $1.999 \ldots 9_{10}$, of which the non-fractional portion again is discarded (this requires simply ignoring the upper bits of the result) to yield the fractional rotational value representing the desired range-reduced angular value, which may be multiplied at 210 by the appropriate constant representing a full circle in the angular measurement system being used ($2\pi$, 360, 400, etc., as discussed above) to obtain the desired angular value 220.

Instructions for carrying out a method according to this invention for programming a programmable device to derive range-reduced angular values may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

FIG. 3 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 4 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 5:
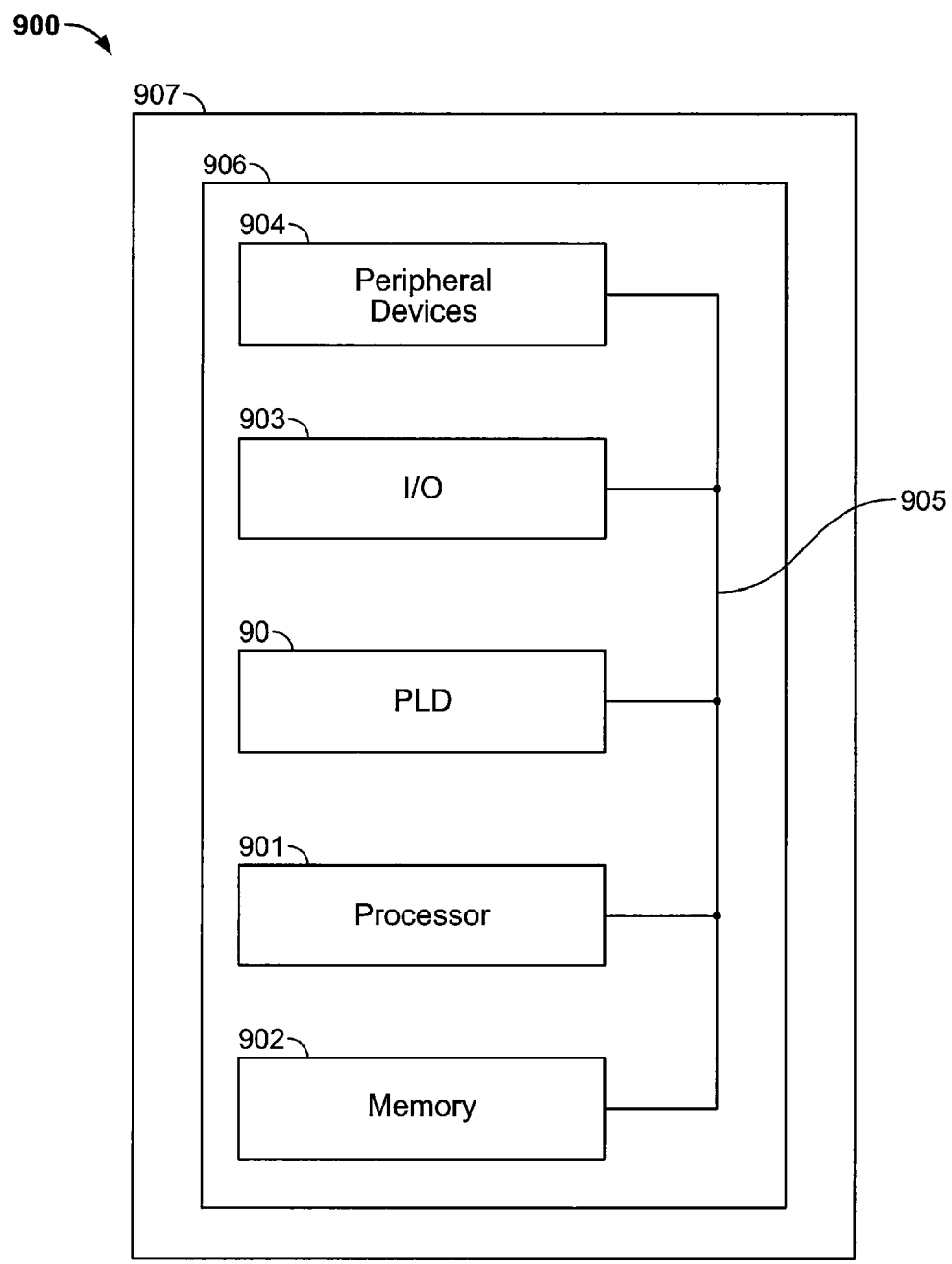
FIG. 5 is a simplified block diagram of an illustrative system employing a programmable logic device incorporating the present invention.

A PLD 90 programmed according to the present invention may be used in many kinds of electronic devices. One possible use is in a data processing system 900 shown in FIG. 5. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions.

For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention.

For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for deriving a range-reduced value of an angle represented by a number having a mantissa and an exponent, said circuitry comprising:
    memory that stores a table that identifies, for each one of a plurality of values of said exponent, a base fractional rotation associated with said one of said plurality of values of said exponent, and an incremental fractional rotation associated with each increment of said mantissa;
    a multiplier that multiplies said mantissa by said incremental fractional rotation to provide a product representing a mantissa contribution; and
    an adder that adds said base fractional rotation to any fractional portion of said mantissa contribution.

2. The circuitry of claim 1 further comprising normalization circuitry for said mantissa contribution.

3. The circuitry of claim 2 wherein said normalization circuitry comprises:
    a count-leading zeroes module to determine a number of leading zeroes right of a binal point of said mantissa;
    a left-shifter module to left-shift said mantissa by said number of leading zeroes;
    circuitry that further shifts said product when it contains a leading zero;
    an adder/subtractor chain for tracking shifting of said mantissa and said product; and a barrel shifter that denormalizes said product based on output of said adder/subtractor chain.

4. The circuitry of claim 1 further comprising circuitry for discarding any non-fractional portion of output of said adder to provide a fractional rotation representing said range-reduced angle.

5. The circuitry of claim 4 further comprising a final multiplier that multiplies said fractional rotation representing said range-reduced angle by a constant representing one complete rotation in a desired angular measurement system, to convert said fractional rotation representing said range-reduced angle to a value representing said range-reduced angle in said desired angular measurement system.

6. A method of deriving, in circuitry, a range-reduced value of an angle represented by a number that has a mantissa and an exponent and that is input into the circuitry, said method comprising:
 storing, in memory in the circuitry, a table that identifies, for each one of a plurality of values of said exponent, a base fractional rotation associated with said one of said plurality of values of said exponent, and an incremental fractional rotation associated with each increment of said mantissa;
 multiplying said mantissa, using multiplication circuits in the circuitry, by said incremental fractional rotation to provide a product representing a mantissa contribution; and
 adding said base fractional rotation, using addition circuits in the circuitry, to any fractional portion of said mantissa contribution.

7. The method of claim 6 further comprising normalizing, using normalization circuits in the circuitry, said mantissa contribution.

8. The method of claim 7 wherein said normalizing comprises:
 determining, using counting circuits in the circuitry, a number of leading zeroes right of a binal point of said mantissa;
 left-shifting said mantissa, using first shifting circuits in the circuitry, by said number of leading zeroes;
 further shifting said product, using second shifting circuits in the circuitry, when said product contains a leading zero;
 tracking, using circuits in the circuitry, shifting of said mantissa and said product; and
 denormalizing said product, using other circuits in the circuitry, based on output of said tracking.

9. The method of claim 6 further comprising discarding any non-fractional portion of output of said adding to provide a fractional rotation representing said range-reduced angle.

10. The method of claim 9 further comprising a multiplying, using multiplication circuits in the circuitry, said fractional rotation representing said range-reduced angle by a constant representing one complete rotation in a desired angular measurement system, to convert said fractional rotation representing said range-reduced angle to a value representing said range-reduced angle in said desired angular measurement system.

11. A method of configuring a programmable integrated circuit device as circuitry for deriving a range-reduced value of an angle represented by a number having a mantissa and an exponent, said method comprising:
 configuring memory of said programmable integrated circuit device to store a table that identifies, for each one of a plurality of values of said exponent, a base fractional rotation associated with said one of said plurality of values of said exponent, and an incremental fractional rotation associated with each increment of said mantissa;
 configuring logic of said programmable integrated circuit device to multiply said mantissa by said incremental fractional rotation to provide a product representing a mantissa contribution; and
 configuring logic of said programmable integrated circuit device to add said base fractional rotation to any fractional portion of said mantissa contribution.

12. The method of claim 11 further comprising configuring logic of said programmable integrated circuit device as normalization circuitry for said mantissa contribution.

13. The method of claim 12 wherein said configuring logic of said programmable integrated circuit device as normalization circuitry comprises:
 configuring logic of said programmable integrated circuit device as a count-leading zeroes module to determine a number of leading zeroes right of a binal point of said mantissa;
 configuring logic of said programmable integrated circuit device as a left-shifter module to left-shift said mantissa by said number of leading zeroes;
 configuring logic of said programmable integrated circuit device to further shift said product when it contains a leading zero;
 configuring logic of said programmable integrated circuit device as an adder/subtractor chain for tracking shifting of said mantissa and said product; and
 configuring logic of said programmable integrated circuit device as a barrel shifter that denormalizes said product based on output of said adder/subtractor chain.

14. The method of claim 11 further comprising configuring logic of said programmable integrated circuit device as circuitry for discarding any non-fractional portion of output of said adder to provide a fractional rotation representing said range-reduced angle.

15. The method of claim 14 further comprising configuring logic of said programmable integrated circuit device to multiply said fractional rotation representing said range-reduced angle by a constant representing one complete rotation in a desired angular measurement system, to convert said fractional rotation representing said range-reduced angle to a value representing said range-reduced angle in said desired angular measurement system.

16. A programmable integrated circuit device comprising:
 memory configured to store a table that identifies, for each one of a plurality of values of said exponent, a base fractional rotation associated with said one of said plurality of values of said exponent, and an incremental fractional rotation associated with each increment of said mantissa;
 logic configured to multiply said mantissa by said incremental fractional rotation to provide a product representing a mantissa contribution; and
 logic configured to add said base fractional rotation to any fractional portion of said mantissa contribution.

17. The programmable integrated circuit device of claim 16 further comprising logic configured as normalization circuitry for said mantissa contribution.

18. The programmable integrated circuit device of claim 17 wherein said logic configured as normalization circuitry comprises:
 logic configured as a count-leading zeroes module to determine a number of leading zeroes right of a binal point of said mantissa;

logic configured as a left-shifter module to left-shift said
mantissa by said number of leading zeroes;

logic configured to further shift said product when it contains a leading zero;

logic configured as an adder/subtractor chain for tracking shifting of said mantissa and said product; and logic configured as a barrel shifter that denormalizes said product based on output of said adder/subtractor chain.

19. The programmable integrated circuit device of claim 16 further comprising logic configured as circuitry for discarding any non-fractional portion of output of said adder to provide a fractional rotation representing said range-reduced angle.

20. The programmable integrated circuit device of claim 19 further comprising logic configured to multiply said fractional rotation representing said range-reduced angle by a constant representing one complete rotation in a desired angular measurement system, to convert said fractional rotation representing said range-reduced angle to a value representing said range-reduced angle in said desired angular measurement system.

21. A non-transitory machine-readable data storage medium encoded with machine-executable instructions for configuring a programmable integrated circuit device as circuitry for deriving a range-reduced value of an angle represented by a number having a mantissa and an exponent, said instructions comprising:

instructions to configure memory of said programmable integrated circuit device to store a table that identifies, for each one of a plurality of values of said exponent, a base fractional rotation associated with said one of said plurality of values of said exponent, and an incremental fractional rotation associated with each increment of said mantissa;

instructions to configure logic of said programmable integrated circuit device to multiply said mantissa by said incremental fractional rotation to provide a product representing a mantissa contribution; and instructions to configure logic of said programmable integrated circuit device to add said base fractional rotation to any fractional portion of said mantissa contribution.

22. The non-transitory machine-readable data storage medium of claim 21 wherein said instructions further comprise instructions to configure logic of said programmable integrated circuit device as normalization circuitry for said mantissa contribution.

23. The non-transitory machine-readable data storage medium of claim 22 wherein said instructions to configure logic of said programmable integrated circuit device as normalization circuitry comprise:

instructions to configure logic of said programmable integrated circuit device as a count-leading zeroes module to determine a number of leading zeroes right of a binal point of said mantissa;

instructions to configure logic of said programmable integrated circuit device as a left-shifter module to left-shift said mantissa by said number of leading zeroes;

instructions to configure logic of said programmable integrated circuit device to further shift said product when it contains a leading zero;

instructions to configure logic of said programmable integrated circuit device as an adder/subtractor chain for tracking shifting of said mantissa and said product; and instructions to configure logic of said programmable integrated circuit device as a barrel shifter that denormalizes said product based on output of said adder/subtractor chain.

24. The non-transitory machine-readable data storage medium of claim 21 wherein said instructions further comprise instructions to configure logic of said programmable integrated circuit device as circuitry for discarding any non-fractional portion of output of said adder to provide a fractional rotation representing said range-reduced angle.

25. The non-transitory machine-readable data storage medium of claim 24 wherein said instructions further comprise instructions to configure logic of said programmable integrated circuit device to multiply said fractional rotation representing said range-reduced angle by a constant representing one complete rotation in a desired angular measurement system, to convert said fractional rotation representing said range-reduced angle to a value representing said range-reduced angle in said desired measurement system.

* * * * *